No. 673,845. Patented May 7, 1901.
A. PINOVER.
VEHICLE WHEEL.
(Application filed Mar. 23, 1900.)
(No Model.)
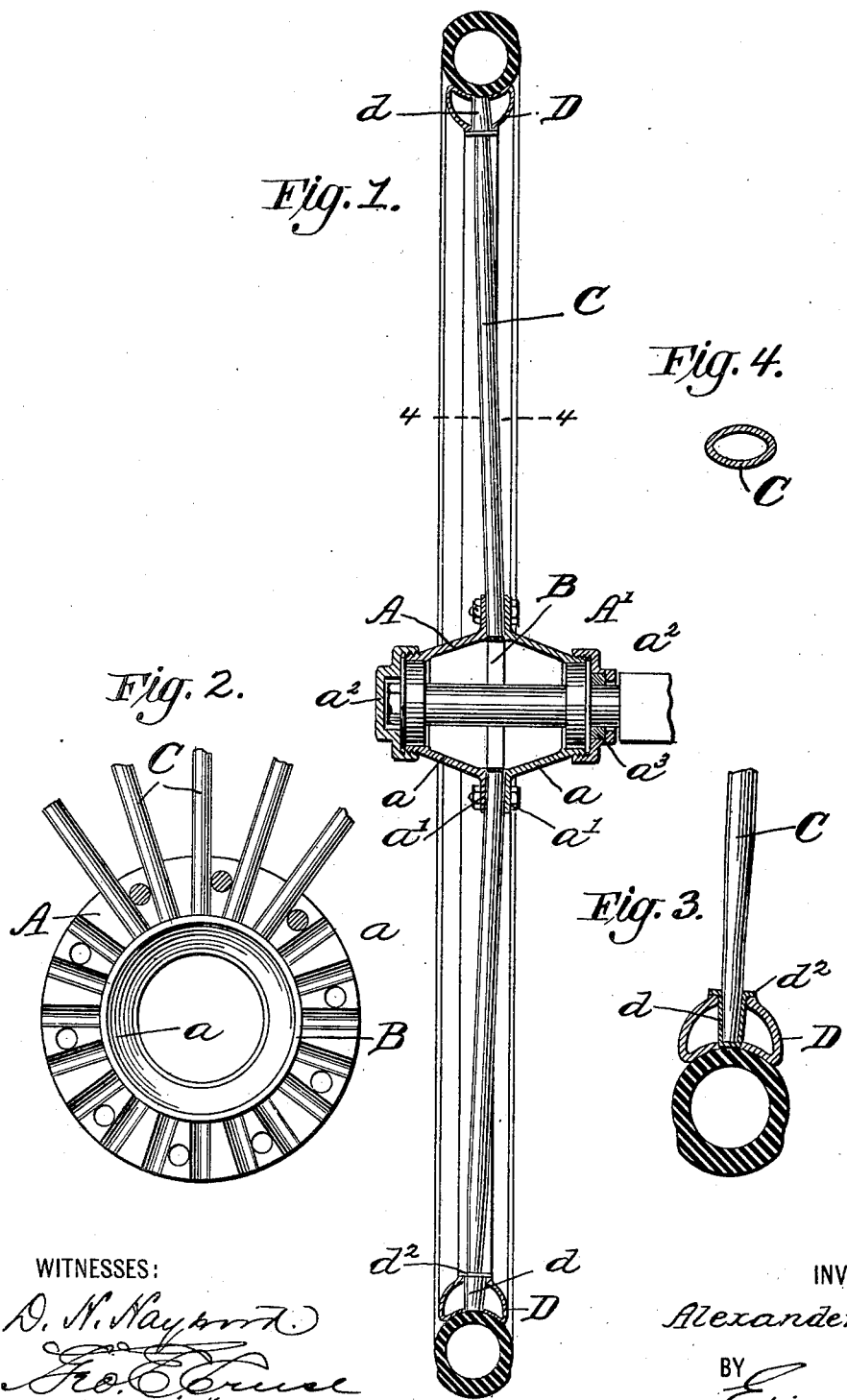

UNITED STATES PATENT OFFICE.

ALEXANDER PINOVER, OF NEW YORK, N. Y., ASSIGNOR TO LESTER COHN, MORTIMER SCHLEESTEIN, AND JEANETTE PINOVER, OF SAME PLACE.

VEHICLE-WHEEL.

SPECIFICATION forming part of Letters Patent No. 673,845, dated May 7, 1901.

Application filed March 23, 1900. Serial No. 9,871. (No model.)

*To all whom it may concern:*

Be it known that I, ALEXANDER PINOVER, a citizen of the United States, residing in the borough of Manhattan, city, county, and State of New York, have invented certain new and useful Improvements in Vehicle-Wheels, of which the following is a specification.

My invention relates to vehicle-wheels.

I will describe a vehicle-wheel embodying my invention and then point out the novel features thereof in the claims.

In the accompanying drawings, Figure 1 is a vertical transverse sectional view of a vehicle-wheel embodying my invention. Fig. 2 is a detail view, partly in section, of one-half of the hub embodied in the wheel. Fig. 3 is a detail sectional view. Fig. 4 is a detail cross-sectional view of one of the spokes at about the point indicated by the line 4 4, Fig. 1.

Similar letters of reference designate corresponding parts in all of the figures.

A A' represent the two halves of the hub. The main portion $a$ of each part is preferably in the form of a truncated cone. Each part is also provided with a peripheral flange $a'$ and with a cap $a^2$. The cap on one half is solid—that is, it is without a central opening—while the other cap is provided with a central opening, through which the end of the axle projects. This cap is also provided with a recess to receive a felt or other washer $a^3$, which surrounds the axle. With this arrangement of the caps the interior of the hub is dust-proof. A substantially closed hub is also provided, in which a solid lubricant may be placed. The hub may also be provided with ball or other bearings.

B represents a ring or band which is placed in seats provided for it in each half of the hub. This ring is without joint and is firmly but yet removably seated in the two halves. It is preferably slightly larger than its seat in the two halves, and when the wheel is being formed it is pressed to its seat in one half.

C represents the spokes which are comprised in the wheel. Each spoke is tubular, and preferably for the greater portion of its length it is oval in cross-section. (See Fig. 4.) The outer end of each spoke is preferably circular in cross-section, and the extreme end is made tapering. (See Fig. 3.) The ends of the spokes are held between the flanges $a'$, grooves being provided for the spokes in the flanges. The inner ends of the spokes also rest upon the ring B, which serves as a support for them. The grooves in the flanges are inclined somewhat, so that the outer ends of the spokes will be out of the vertical center of the wheel, thus producing a "dished" wheel. The two halves are bolted together through their flanges, thus securing the spokes in the hub.

D represents a tubular rim of metal. As shown, it is of metal and substantially crescent-shaped in cross-section, which may be obtained by drawing a tube which is to form the rim through a die of the requisite shape. After it has been drawn through the die it may be spun into a circle and the ends welded or otherwise connected together. The rim is provided with a number of openings, in which the tapered ends of the spokes fit. A tapered cap $d$ is provided on the end of each spoke, and this cap fits into its opening in the rim. Each cap is provided with a flange $d^2$, which bears against the inner periphery of the rim, the purpose of which is to keep its spoke from coming out of the socket in the hub. The openings in the rim are also preferably tapered and slightly smaller than the caps $d$, so that the caps will have to be forced into the openings.

What I claim as my invention is—

1. In a vehicle-wheel, the combination of a sectional hub, each section being provided with a flange by means of which the sections are detachably connected together, a ring seated in both of said sections and beneath the flanges, recesses formed in said flanges which when the flanges are secured together form sockets for the reception of spokes, a rim, and spokes intermediate the hub and rim, said spokes being oval in cross-section for a portion of their length and where they fit in the said sockets.

2. In a vehicle-wheel, the combination of a sectional hub, the sections of which are detachably connected together, spokes held at one of their ends in said hub, flanged and tapered caps on the outer ends of said spokes, and a hollow rim having a number of opposite openings in opposite portions thereof through which said caps extend, said opposite openings being of different sizes to accommodate the caps.

3. The combination in a vehicle-wheel, of a hollow hub into which the axle extends, a closed cap for one open end of said hub, and a cap having a central opening for the other end of said hub, said cap being provided with a recess and a washer fitting therein.

In testimony whereof I have signed my name to this specification in the presence of two subscribing witnesses.

ALEXANDER PINOVER.

Witnesses:
CHARLES HAY,
HARRY A. PINOVER.